United States Patent
Locker et al.

(10) Patent No.: US 9,223,340 B2
(45) Date of Patent: Dec. 29, 2015

(54) ORGANIZING DISPLAY DATA ON A MULTIUSER DISPLAY

(71) Applicant: LENOVO (Singapore) PTE, LTD., New Tech Park (SG)

(72) Inventors: Howard Locker, Cary, NC (US); Michaela Rose Case, Raleigh, NC (US); John Weldon Nicholson, Cary, NC (US); Aaron Michael Stewart, Raleigh, NC (US)

(73) Assignee: Lenovo (Singapore) PTE. LTD., Tech Park (SG)

( * ) Notice: Subject to any disclaimer, the term of this patent is extended or adjusted under 35 U.S.C. 154(b) by 83 days.

(21) Appl. No.: 13/967,200

(22) Filed: Aug. 14, 2013

(65) Prior Publication Data

US 2015/0049010 A1  Feb. 19, 2015

(51) Int. Cl.
| | |
|---|---|
| *G06F 1/16* | (2006.01) |
| *G06F 3/033* | (2013.01) |
| *G06F 3/043* | (2006.01) |
| *G06F 3/0481* | (2013.01) |
| *G06F 3/0488* | (2013.01) |
| *G06F 3/0354* | (2013.01) |

(52) U.S. Cl.
CPC ............. *G06F 1/1605* (2013.01); *G06F 3/033* (2013.01); *G06F 3/03545* (2013.01); *G06F 3/0433* (2013.01); *G06F 3/0481* (2013.01); *G06F 3/04886* (2013.01)

(58) Field of Classification Search
None
See application file for complete search history.

(56) References Cited

U.S. PATENT DOCUMENTS

| | | |
|---|---|---|
| 7,724,242 B2 | 5/2010 | Hillis et al. |
| 7,728,821 B2 | 6/2010 | Hillis et al. |
| 8,072,439 B2 | 12/2011 | Hillis et al. |
| 2005/0285845 A1 | 12/2005 | Dehlin |
| 2006/0031786 A1 | 2/2006 | Hillis et al. |
| 2006/0274046 A1 | 12/2006 | Hillis et al. |
| 2007/0046643 A1 | 3/2007 | Hillis et al. |
| 2007/0220444 A1 | 9/2007 | Sunday et al. |
| 2007/0273670 A1 | 11/2007 | Nordahl |
| 2007/0300182 A1 | 12/2007 | Bilow |
| 2008/0192059 A1 | 8/2008 | Kennedy |
| 2008/0240514 A1 | 10/2008 | Zhang et al. |
| 2009/0085881 A1 | 4/2009 | Keam |
| 2009/0164938 A1* | 6/2009 | Wang ............................ 715/803 |
| 2009/0273559 A1 | 11/2009 | Rofougaran et al. |
| 2010/0033549 A1 | 2/2010 | Sato |
| 2010/0083109 A1 | 4/2010 | Tse et al. |
| 2010/0095233 A1 | 4/2010 | Skourup et al. |
| 2010/0117979 A1 | 5/2010 | Hillis |
| 2010/0225595 A1 | 9/2010 | Hodges et al. |
| 2010/0281440 A1 | 11/2010 | Underkoffler et al. |
| 2010/0318904 A1 | 12/2010 | Hillis et al. |
| 2011/0022991 A1 | 1/2011 | Hillis et al. |
| 2011/0032215 A1 | 2/2011 | Sirotich et al. |
| 2011/0047478 A1 | 2/2011 | Ellsworth |
| 2011/0111833 A1 | 5/2011 | Nordahl et al. |

(Continued)

OTHER PUBLICATIONS

U.S. Appl. No. 13/907,285, Office Action, Jan. 21, 2015.

(Continued)

*Primary Examiner* — Joseph Haley
(74) *Attorney, Agent, or Firm* — Kunzler Law Group

(57) ABSTRACT

For organizing display data on a multiuser display, a position module determines a user position from an audible signal. An organization module organizes display data on a multiuser display in response to the user position.

17 Claims, 11 Drawing Sheets

(56) References Cited

U.S. PATENT DOCUMENTS

| | | |
|---|---|---|
| 2011/0119624 A1 | 5/2011 | Coldefy et al. |
| 2011/0175920 A1 | 7/2011 | Ieperen |
| 2011/0197263 A1 | 8/2011 | Stinson, III |
| 2011/0284296 A1* | 11/2011 | Harel et al. ............ 178/19.02 |
| 2012/0249463 A1 | 10/2012 | Leung et al. |
| 2012/0268372 A1 | 10/2012 | Park et al. |
| 2012/0274598 A1 | 11/2012 | Uy |
| 2012/0316876 A1* | 12/2012 | Jang et al. ............... 704/246 |
| 2013/0050131 A1 | 2/2013 | Lee et al. |
| 2013/0055143 A1 | 2/2013 | Martin et al. |
| 2013/0083074 A1 | 4/2013 | Nurmi et al. |
| 2013/0093708 A1 | 4/2013 | Annett et al. |
| 2013/0100057 A1 | 4/2013 | Annett et al. |
| 2013/0162600 A1 | 6/2013 | Chou et al. |
| 2013/0191753 A1 | 7/2013 | Sugiyama et al. |
| 2013/0278507 A1 | 10/2013 | Hintermeister |
| 2013/0318445 A1 | 11/2013 | Mitchell et al. |
| 2014/0136981 A1* | 5/2014 | Xiang et al. ............... 715/728 |
| 2014/0152537 A1 | 6/2014 | Abdelsamie et al. |
| 2014/0267130 A1 | 9/2014 | Hwang et al. |

OTHER PUBLICATIONS

Michelle Annett et al., "Medusa: A Proximity-Aware Multi-touch Tabletop", UIST 2011 Conference Proceedings: ACM Symposium on User Interface Software & Technology, pp. 337-382, (Published 2011), http://autodeskresearch.com/pdf/p337.pdf> (Retrieved: Jan. 7, 2015).

"Medusa: A Proximity-Aware Multi-touch Tabletop", YouTube video (Published by Autodesk Research on Dec. 14, 2012), https://www.youtube.com/watch?v=rjbKmyxCuEw (Retrieved Jan. 7, 2015).

U.S. Appl. No. 13/944,719 Office Action, Dec. 16, 2014.

U.S. Appl. No. 13/907,285, Office Action, Jun. 29, 2015.

* cited by examiner

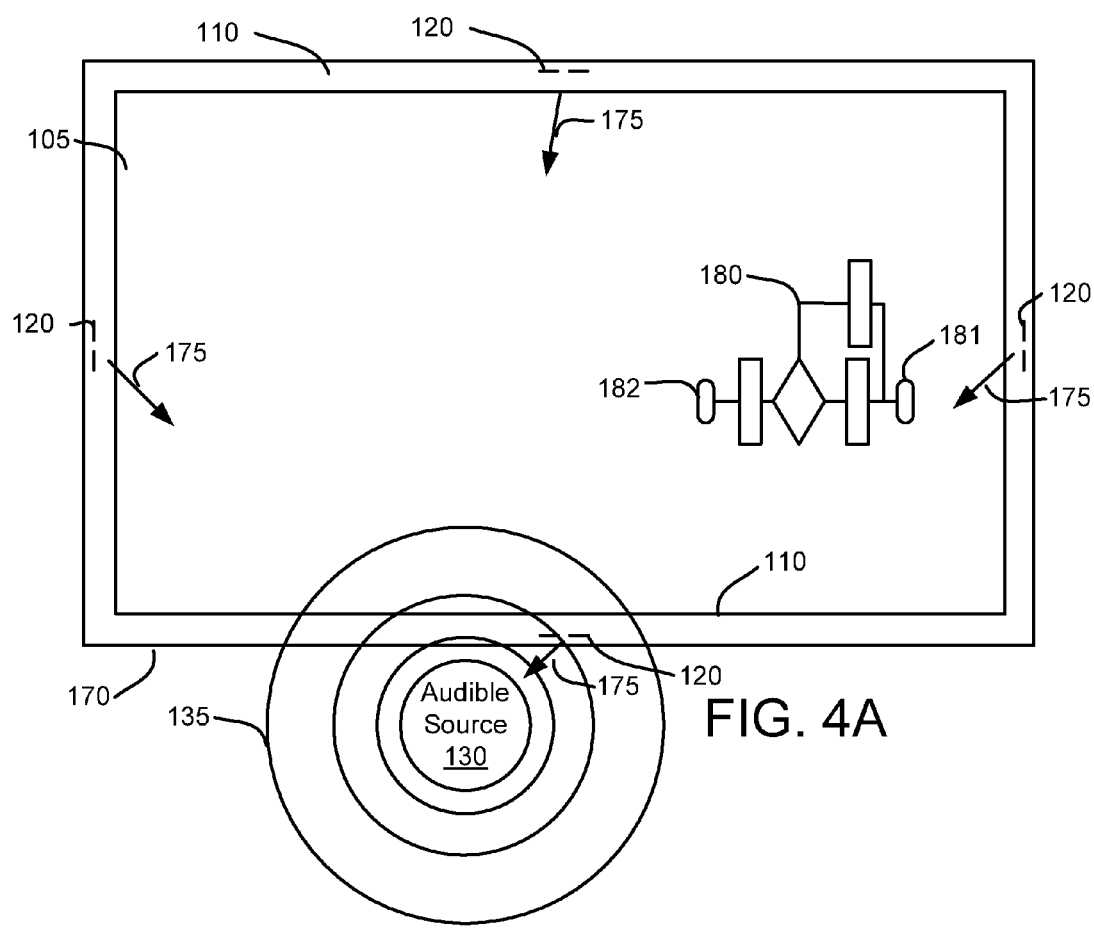

ORGANIZING DISPLAY DATA ON A MULTIUSER DISPLAY

BACKGROUND

1. Field

The subject matter disclosed herein relates to multiuser displays and more particularly relates to organizing display data for a multiuser display.

2. Description of the Related Art

The users of traditional small displays and monitors had to be positioned within a relatively small area to view the display, so that a single organization of data relative to the user's position was sufficient. However, large multiuser displays allow a user to interact with the display from many positions.

BRIEF SUMMARY

An apparatus for organizing display data on a multiuser display is disclosed. The apparatus includes a processor, a multiuser display accessible to the processor, and a memory storing machine readable code executable by the processor. The machine readable code includes a position module and an organization module. The position module determines a user position from an audible signal. The organization module organizes display data on the multiuser display in response to the user position. A method and a program product also perform the functions of the apparatus.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIGS. 4A-K are drawings illustrating embodiments of organizing display data on a multiuser display;

DETAILED DESCRIPTION

Figure 1:
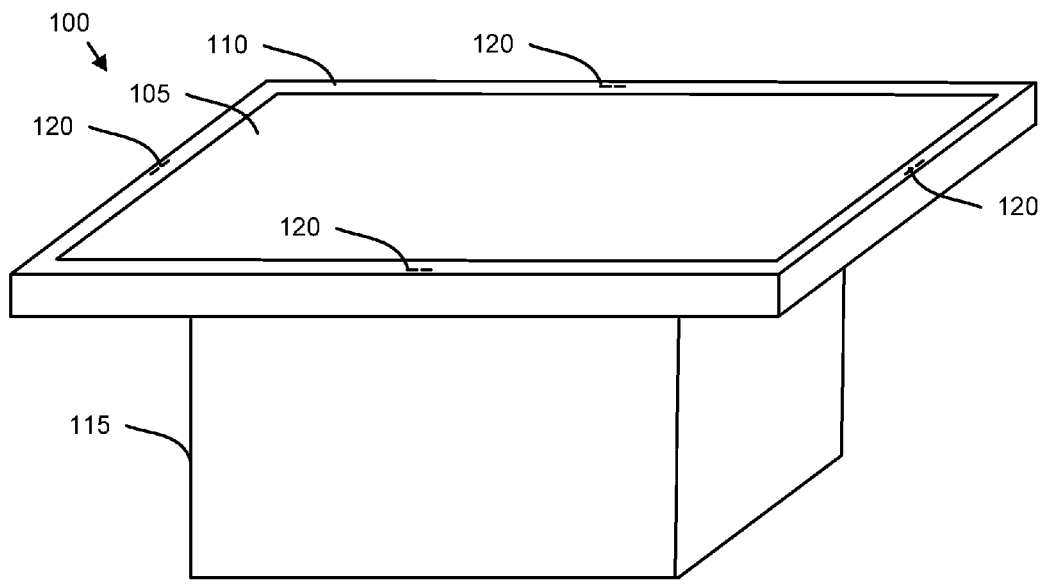
FIG. 1 is a perspective drawing illustrating one embodiment of a multiuser display.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code. The storage devices may be tangible, non-transitory, and/or non-transmission.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in machine readable code and/or software for execution by various types of processors. An identified module of machine readable code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of machine readable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices, and may exist, at least partially, merely as electronic signals on a system or network. Where a module or portions of a module are implemented in software, the software portions are stored on one or more computer readable storage devices.

Any combination of one or more computer readable medium may be utilized. The computer readable medium may be a machine readable signal medium or a storage device. The computer readable medium may be a storage device storing the machine readable code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A machine readable signal medium may include a propagated data signal with machine readable code embodied therein, for example, in baseband or as part of a carrier wave. Such a propagated signal may take any of a variety of forms, including, but not limited to, electro-magnetic, optical, or any suitable combination thereof, A machine readable signal medium may be any storage device that is not a computer readable storage medium and that can communicate, propagate, or transport a program for use by or in connection with an instruction execution system, apparatus, or device. Machine readable code embodied on a storage device may be transmitted using any appropriate medium, including but not limited to wireless, wire-line, optical fiber cable, Radio Frequency (RF), etc., or any suitable combination of the foregoing.

Machine readable code for carrying out operations for embodiments may be written in any combination of one or more programming languages, including an object oriented programming language such as Java, Smalltalk, C++ or the like and conventional procedural programming languages, such as the "C" programming language or similar programming languages. The machine readable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by machine readable code. These machine readable code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The machine readable code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The machine readable code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and machine readable code. Descriptions of figures may refer to elements described in previous figures, like numbers referring to like elements.

FIG. 1 is a perspective drawing illustrating one embodiment of a multiuser display 105. The multiuser display 105 may be a touchscreen display. In one embodiment, the multiuser display 105 is a HORIZON® display manufactured by Lenovo of Morrisville, N.C.

The multiuser display 105 may include a bezel 110. In addition, the multiuser display 105 may include one or more microphone arrays 120. In one embodiment, the microphone arrays 120 are disposed in the bezel 110. Alternatively, a microphone array 120 may be separate from the multiuser display 105. For example, the microphone array 120 may be suspended above the multiuser display 105. In addition, the microphone array 120 may be embodied in a separate device that is in communication with the multiuser display 105 through a wired connection, a wireless connection, or the like.

In the depicted embodiment, the multiuser display 105 is disposed horizontally so the user may interact with the multiuser display 105 as though interacting with the tabletop. The multiuser display 105 may be mounted on a stand 115. Alternatively, the multiuser display 105 may be portable. For example, the multiuser display 105 may be set upon a conference table and/or counter. In one embodiment, the multiuser display 105 is disposed vertically.

In one embodiment, the multiuser display 105 includes a computer. Alternatively, the multiuser display 105 may communicate with an external computer. In one embodiment, the multiuser display 105 is a flexible medium. The multiuser display 105 may be rolled for transport and unrolled for use.

A user may interact with the multiuser display 105 by touching the multiuser display with an electronic pen, a stylus, a finger or multiple fingers, a knuckle, and the like. Alternatively, the user may interact with a multiuser display 105 through virtual keyboard. In addition to detecting the direct contact of the electronic pen, stylus, finger, fingers, typing, or the like, the multiuser display 105 may also detect an audible signal. The audible signal may be detected by the one or more microphone arrays 120.

In the past, small touch screen displays were easily rotated by the user. In addition, the small size and substantially vertical mounting of larger displays limited the positions from which a user could interact with the display. However, a user can interact with the multiuser display 105 from many positions. For example, users could be positioned on any of the sides and/or corners of the multiuser display 105. In addition, multiple users can concurrently interact with the multiuser display 105 from substantially different positions and orientations. As a result, traditional static orientations of display data do not take full advantage of the capabilities of the multiuser display 105.

The embodiments described herein determine a user position at the multiuser display 105 from an audible signal. The embodiments further organize display data on the multiuser display 105 in response to the user position as will be described hereafter.

Figure 2A:
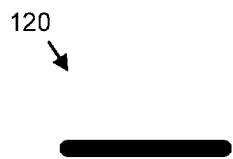
FIGS. 2A-B are top view drawings illustrating embodiments of microphone arrays.
Figure 2B:

FIGS. 2A-B are top view drawings illustrating embodiments of microphone arrays 120. FIG. 2A depicts a microphone array 120 with a single microphone. Multiple microphone arrays 120 with single microphones may be used to determine a location of an audible signal source or audible source using sound source localization. FIG. 2B shows a microphone array 120 with two microphones. In one embodiment, at least two microphones of a microphone array 120 are separated spatially. In a certain embodiment, no more than two microphones of the microphone array 120 are co-linear.

The microphone array 120 may receive the audible signal. In addition, the microphone array 120 may convert the audible signal into an electrical audio signal. The audio signal may be an analog signal, a digital signal, or combinations thereof. In one embodiment, the microphone array 120 converts the audible signal into an analog audio signal and subsequently digitizes the analog audio signal into a digital audio signal.

Figure 3:
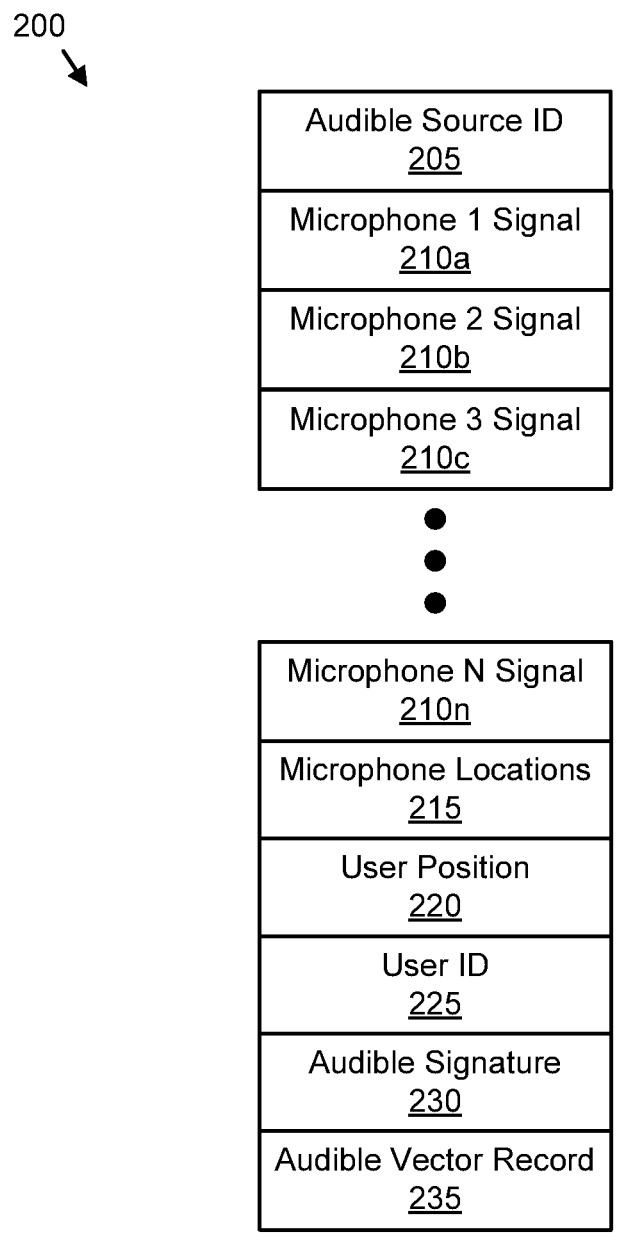
FIG. 3 is a schematic block diagram illustrating one embodiment of audible signal data.

FIG. 3 is a schematic block diagram illustrating one embodiment of audible signal data 200. The audible signal data 200 may be recorded for the audible signal. The audible signal data 200 includes an audible source identifier 205, one or more microphone signals 210, microphone locations 215, a user position record 220, a user identifier 225, an audible signature 230, and one or more source vector records 235. The audible signal data 200 may be created for each audible signal detected by one or more microphone arrays 120. Alternatively, the audible signal data 200 may be created for each audible signal with the unique audible signature 230.

The audible signal identifier 205 may uniquely identify the audible signal. In one embodiment, the audible signal identifier 205 is assigned for each audible signal that is determined to have a unique audible signature 230.

The microphone signals 210 comprise the audio signals from each microphone in the microphone arrays 124 the audible signal. For example, eight microphones in for microphone arrays 120 may record the audible signal. The audio signal from each of the eight microphones may be recorded as microphone signals 210. The microphone signals 210 may be recorded as analog audio signals and/or digital audio signals.

The microphone locations 215 may comprise a location of each microphone in each microphone array 120 relative to the multiuser display 105. In one embodiment, sound source localization is used to determine the one or more audible vectors to a source of the audible signal. The audible vectors are stored in the audible vector record 235. In one embodiment, an audible vector is calculated for each of the microphone arrays 120.

The user position record 220 may comprise an estimated user position. In one embodiment, the user position is a volume comprising an intersection of two or more audible vectors. Alternatively, the user position may be estimated to be of volume adjacent to the multiuser display 105 that intersects at least one audible vector.

The user identifier 225 may uniquely identify the user associated with the audible signal. In one embodiment, the user is identified through voice recognition. Alternatively, the user may be prompted to self identify. In one embodiment, the user is prompted to self identify in response to detecting the audible signal. In a certain embodiment, the audible signal is emitted from an ultrasonic pen and/or an acoustic pen. The ultrasonic pen and/or acoustic pen may be associated with the user. In addition, the ultrasonic pen and/or acoustic pen may self identify to the multiuser display 105. Thus the user identifier 225 may be determined from the identity of the ultrasonic pen and/or the acoustic pen. The user identifier 225 may include a username, a user identification number, a user password, a user voice print, a handedness, or the like.

The audible signature 230 may characterize the audible signal. The audible signature 230 may be a transform of the audible signal such as a fast Fourier transform, a frequency histogram, an average frequency, and the like of the audio signal. In one embodiment, a transform of each audible signal received by the microphone arrays 120 is compared with one or more audible signatures 230 to identify the audible signals.

FIG. 4A is a top view drawing illustrating one embodiment of organizing display data 180 on a multiuser display 105. The multiuser display 105 may be horizontally disposed as illustrated in FIG. 1. The multiuser display 105 is depicted as displaying display data 180. Although the display data 180 is depicted as a graphical flowchart in order to more easily show the orientation, one of skill in the art will recognize that the display data 180 may be any type of data that is displayed by electronic devices including an operating system, text data, image data, video data, controls, interfaces, and the like.

In the depicted embodiment, a user is located at a user position co-located with an audible source 130. The user position is adjacent to the multiuser display 105, but is on opposite edge 170 of the multiuser display 105 from the display data 180. In addition, the display data 180 is oriented away from the user position rather than towards the user position. As used herein, display data 180 may be oriented toward the user position when a bottom 181 of the display data 180 is closer to the user position then a top 182 of the display data 180. In one embodiment, the bottom 181 of the display data 180 is parallel to the bezel 110 and/or edge 170 adjacent to the display data 180. Thus the display data 180 may be oriented towards the user position 185 when the bottom 181 of the display data 180 is adjacent to and parallel to the bezel 110 and/or edge 170 nearest to the user position 185.

The audible source 130 generates the audible signal 135. The audible signal 135 is depicted as concentric rings. In one embodiment, the audible signal 135 may be user speech. Alternatively, the audible signal 135 may be sounds resulting from a user movement such as walking, taking notes, sipping a beverage, or the like. The one or more microphone arrays 120 receive the audible signal 135. The user position may be determined from the audible signal 135 received at the microphone arrays 120. In one embodiment, an audible vector 175 is determined. The audible vector 175 may intersect a microphone array 120 and the audible source 130. The audible vector 175 may be calculated using sound source localization as will be described hereafter.

Figure 4B:
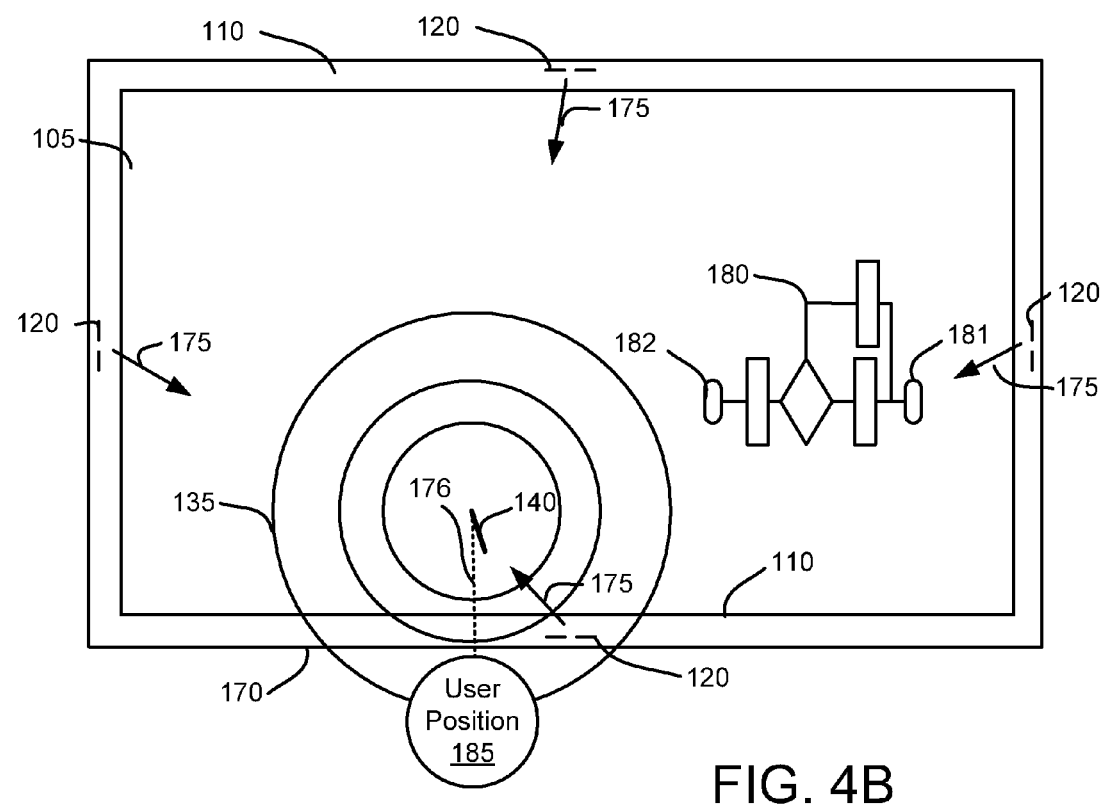

FIG. 4B is a top view drawing depicting a pen 140 generating the audible signal 135. The pen 140 may be an ultrasonic pen, an acoustic pen, or the like. Alternatively, a surface touch acoustic may generate the audible signal 135. The surface touch acoustic may be generated by typing on a virtual keyboard on the multiuser display 105, touching the multiuser display 105 with a finger or a stylus, or the like.

The audible signal 135 from the pen 140 is received by the microphone arrays 120 and a user position 185 is determined. An audible vector 175 may be calculated from each microphone array 122 the pen 140. The location of the pen 140 may be determined from the audible vectors 175. In one embodiment, the user position 185 is determined to be adjacent to the bezel 110 and/or edge 170 nearest to the pen 140. The user position 185 may be along a pen vector 176 normal to the edge 170 and/or bezel 110 and parallel to the surface of the multiuser display 105 that intersects the location of the pen 140. In one embodiment, the user position 185 is offset from the pen vector 176 in a direction parallel to the edge 170 and/or bezel 110. The offset may be to the left for right-handed user and to the right for a left-handed user. The user identifier 225 may store the handedness information.

Figure 4C:
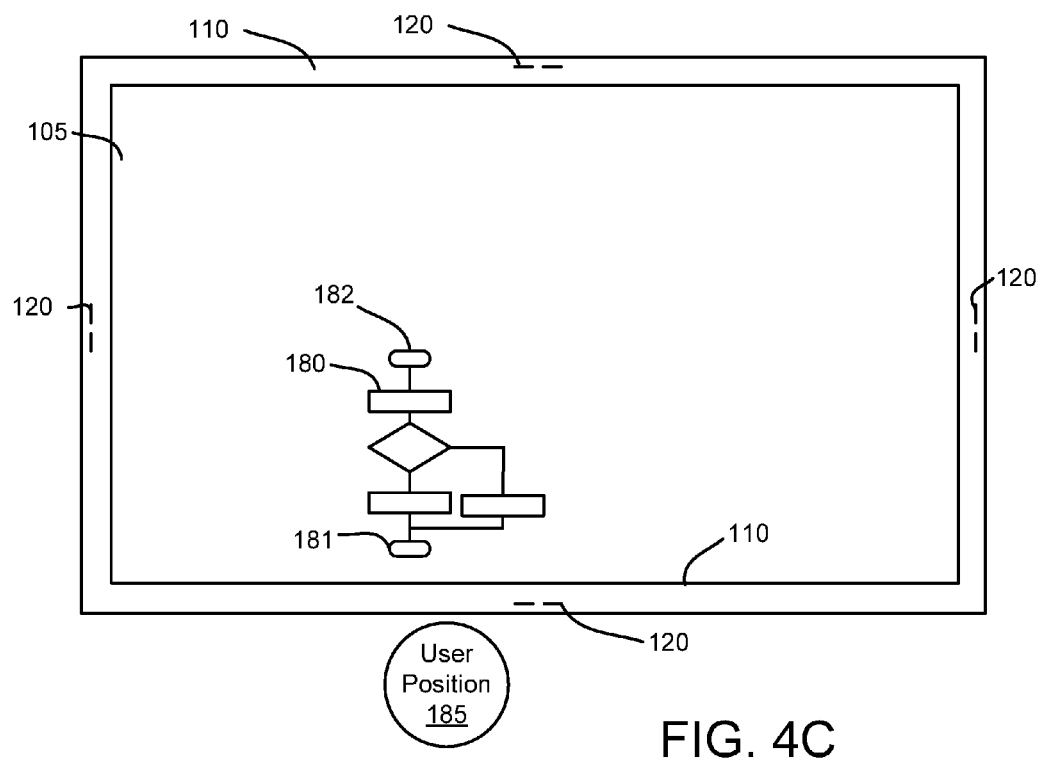

FIG. 4C is a top view drawing illustrating one embodiment of organizing display data 180 on the multiuser display 105. In response to determining the user position 185 from the audible signal 135 as illustrated in FIGS. 4A-B, the display data 180 is depicted as organized on the multiuser display 105 in response to the user position 185. In the depicted embodiment, the display data 180 is organized as oriented toward the user position 185. In one embodiment, the center of the display data 180 aligned with a center of the multiuser display 105. Alternatively, the center of the display data 180 may be aligned with the user position 185.

Figure 4D:
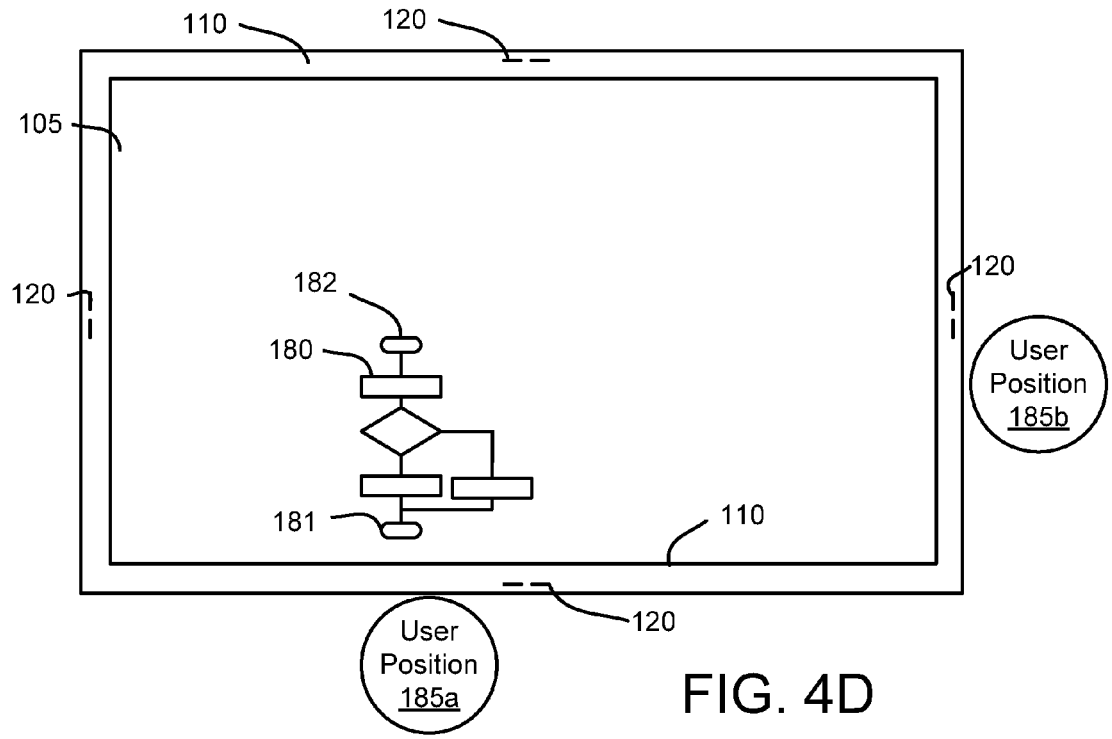

FIG. 4D is a top view drawing illustrating one embodiment of organizing display data 180 on the multiuser display 105. In the depicted embodiment, the display data 180 is oriented towards a first user position 185*a*. The display data 180 may be oriented towards the first user position 185*a* in response to detecting the audible signal 135 from the first user position 185*a*.

Figure 4E:
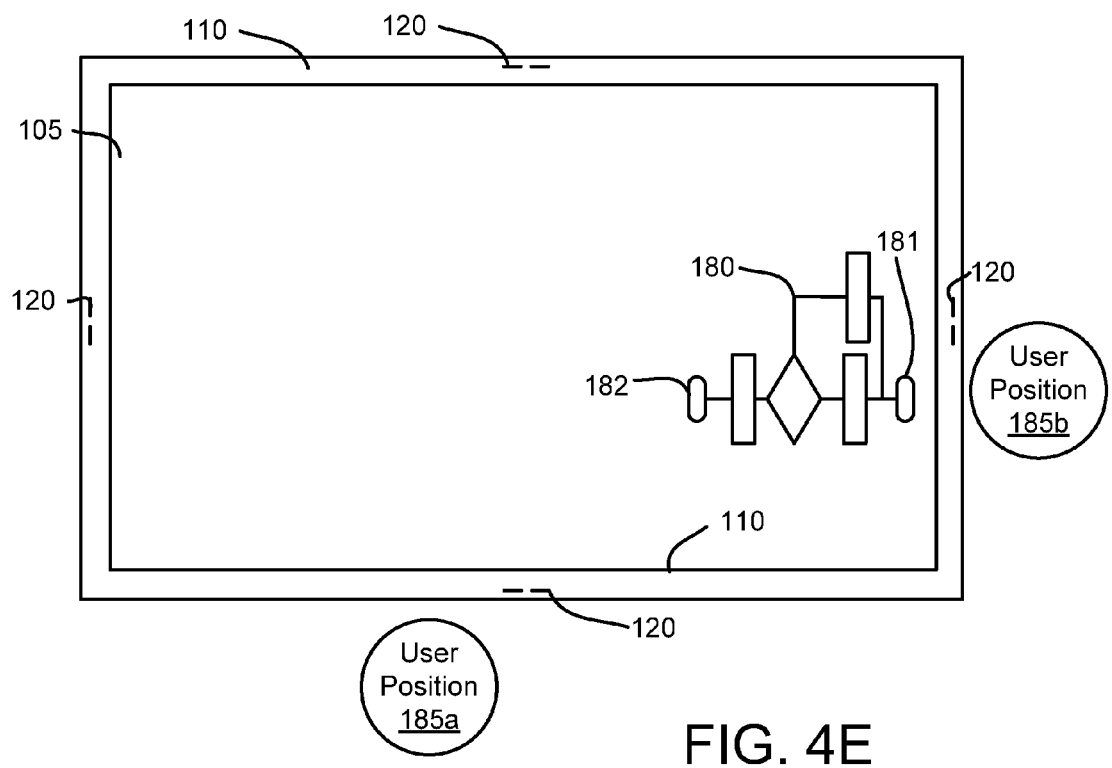

FIG. 4E is a top view drawing illustrating one embodiment of organizing display data 180 on the multiuser display 105. In the depicted embodiment, the display data 180 of FIG. 4D is oriented towards the second user position 185*b* in response to detecting another audible signal 135 from the second user position 185*b*. Thus the display data 180 may be organized oriented towards the user position 185 associated with the most recent audible signal 135.

Figure 4F:
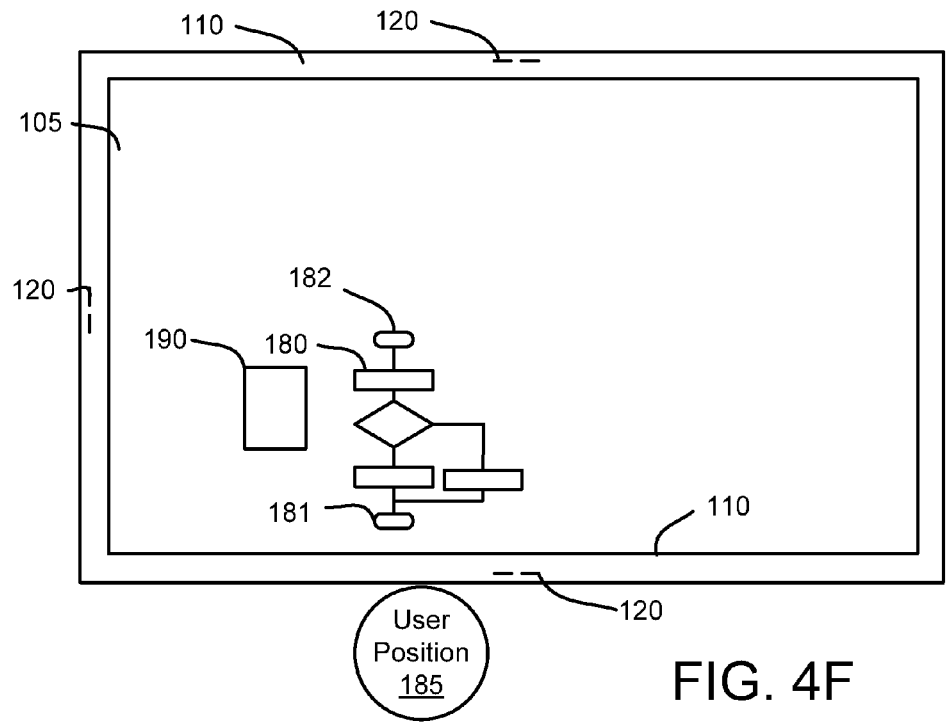

FIG. 4F is a top view drawing illustrating one embodiment of organizing display data 180 on a multiuser display 105. The user position 185 may be determined from the audible signal 135. In addition, the user at the user position 185 may be identified from the audible signal 135. In one embodiment, the user is identified using voice identification. For example, a voice print of the user may be compared with the audible signal 135 to determine if the audible signal 135 is from the user. The display data 180 is organized by providing the display data 180 with user information 190 for the user.

The user information 190 may include one or more email accounts, one or more instant messaging accounts, one or more telephone interfaces, one or more video interfaces, one or more financial data interfaces, and one or more media interfaces. In one embodiment, the user information 190 includes data files, documents, data sources, and the like selected by the user. The data files, documents, data sources, and the like may reside on a remote server.

In one embodiment, organizing the display data 180 includes configuring the display data 180 and/or the user information 190 with the user preferences for the user. The user preferences may include but are not limited to language, display colors, display background, display image size, display font size, display font, and the like.

Figure 4G:
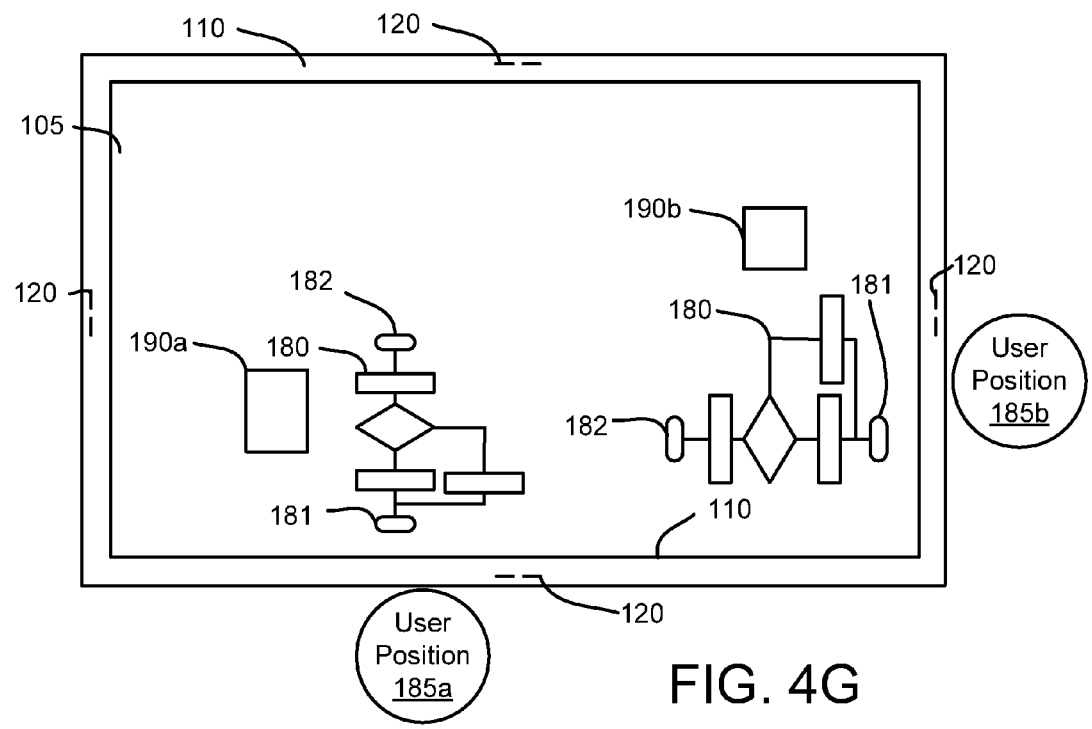

FIG. 4G is a top view drawing illustrating one embodiment of organizing display data 180 on the multiuser display 105. The multiuser display 105 of FIG. 4F is depicted with a first user at a first user position 185*a*. The first user position 185*a* may be determined from a first audible signal 135. First display data 180*a* is organized on the multiuser display 105 in response to the first user position 185*a*.

In addition, a second user is depicted at a second user position 185*b*. The second user position 185*b* may be determined from a second audible signal 135. In response to the first user position 185*a* and the second user position 185*b*, the multiuser display 105 organizes the display data 180. In the depicted embodiment, a first instance of the display data 180*a* is oriented towards the first user position 185*a* while a second instance of the display data 180*b* is oriented towards the second user position 185*b*.

In the depicted embodiment, organizing the display data 180 in response to the first user position 185*a* and the second user position 185*b* includes displaying first user information 190*a* for the first user position 185*a* and displaying second user information 190*b* for the second user position 185*b*. The first user information 190*a* may be oriented towards the first user position 185*a* while the second user information 190*b* may be oriented towards the second user position 185*b*.

In addition, organizing the display data 180 in response to the first user position 185*a* and the second user position 185*b* may further include configuring the first display data 180*a* with first user preferences for the first user. The second display data 180*b* may also be configured with second user preferences for the second user.

In an alternative embodiment, the first display data 180*a* and the second display data 180*b* are configured with combined preferences that comprise both the first user preferences and the second user preferences. For example, the font size of the combined preferences may be no smaller than the largest font size of the first user preferences and the second user preferences. Similarly, the combined preferences may be set to default values for each element of the first user preferences that is not equivalent to the corresponding element of the second user preferences.

Figure 4H:
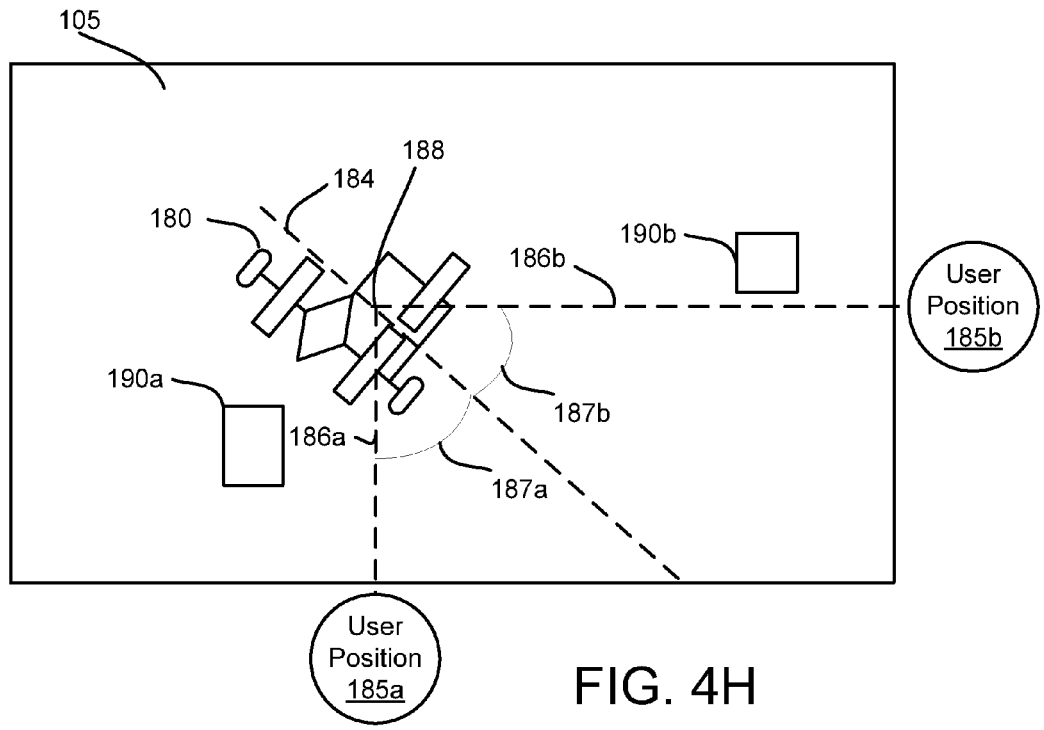

FIG. 4H is a top view drawing illustrating one embodiment of organizing display data 180 on the multiuser display 105. In the depicted embodiment, a single instance of display data 180 is organized as oriented towards both the first user position 185a and the second user position 185b. The display data 180 may be so organized in response to the first user position 185a and the second user position 185b. In one embodiment, the display data 180 is oriented so that a first display angle 187a between the top-to-bottom axis 184 and a first user vector 186a is equivalent to a second display angle 187b between the top-to-bottom axis 184 and a second user vector 186b. Each user vector 186 may intersect a center of a user position 185 and a center 188 of the display data 180. The user vectors 186 may be normal to the edge 170 and/or bezel 110 adjacent to the user position 185. In one embodiment, the user vectors 186 are pen vectors. The user information 190 for each user may be oriented toward the user position 185 of the user.

Figure 4I:
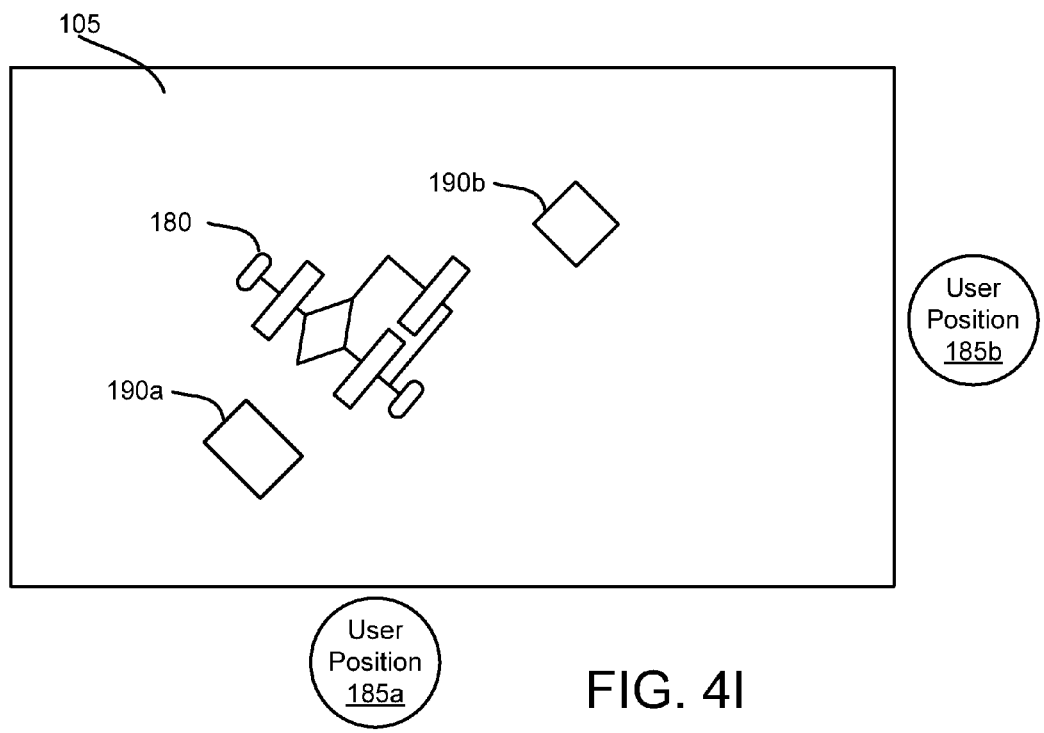

FIG. 4I is a top view drawing illustrating one embodiment of organizing display data 180 on the multiuser display 105. The single instance of display data 180 is organized as oriented towards both the first user position 185a and the second user position 185b as shown in FIG. 51. In addition, the first user information 190a and the second user information 190b are oriented parallel to the orientation of the display data 180.

Figure 4J:
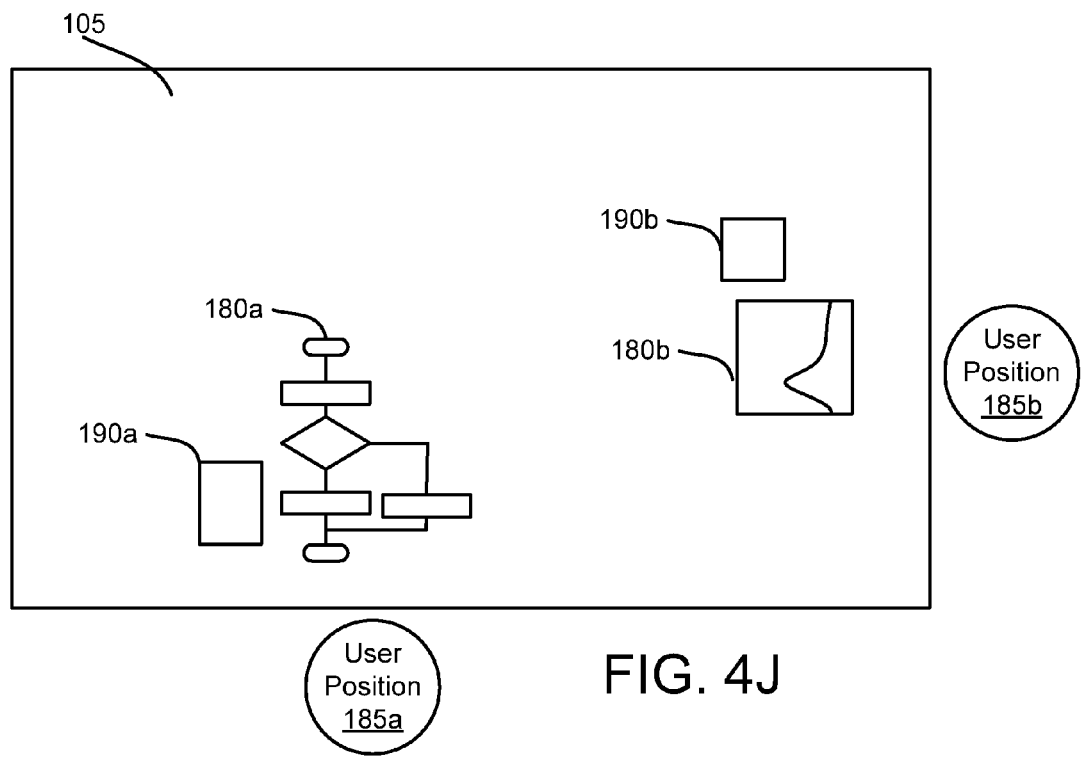

FIG. 4J is a top view drawing illustrating one embodiment of organizing display data 180 on the multiuser display 105. In the depicted embodiment, the first display data 180a is organized as oriented towards the first user position 185a. Second display data 180b that is different from the first display data 180a is organized as oriented towards the second user position 185b. Thus a first user at the first user position 185a and the second user at the second user position 185b may concurrently view different display data 180.

Figure 4K:
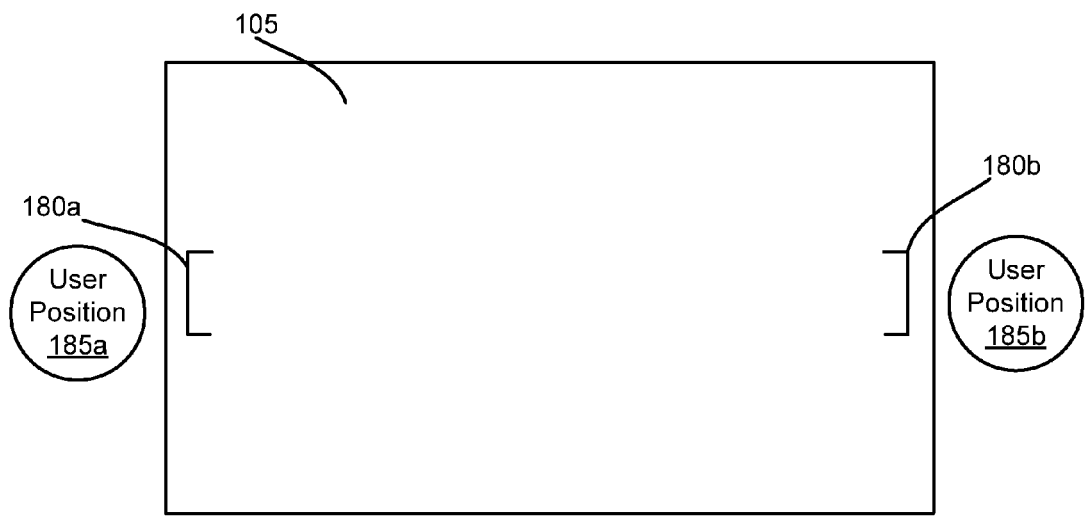

FIG. 4K is a top view drawing illustrating one embodiment of organizing display data 180 on the multiuser display 105. In the depicted embodiment, first display data 180a is organized as oriented toward a first user position 185a in response to determining the first user position 185a from the audible signal 135.

The second user position 185b is determined relative to the first user position 185a. In addition, second display data 180b is organized as oriented toward the second user position 185b. The second user position 185b may be inferred solely from the first user position 185a.

In the depicted embodiment, the first and second users are playing a game of air hockey. The first user position 185 is determined from an audible signal 135 (not shown). The second user position 185b is determined relative to the first user position 185a as opposite to the first user position 185a.

Figure 5:
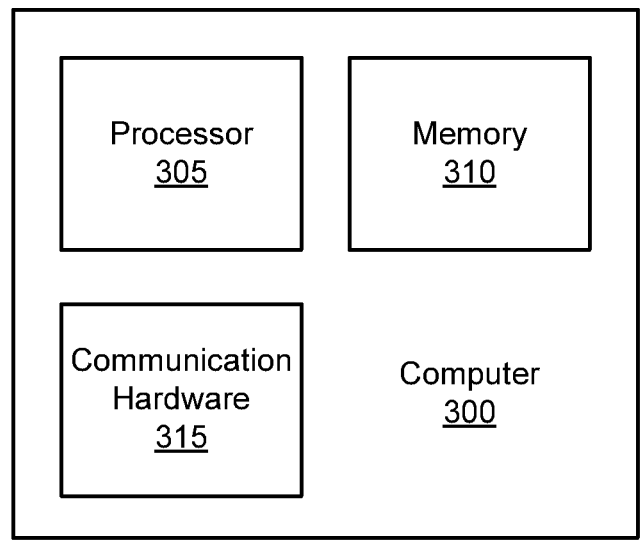
FIG. 5 is a schematic block diagram illustrating one embodiment of a computer.

FIG. 5 is a schematic block diagram illustrating one embodiment of a computer 300. The computer 300 may be embodied in the multiuser display 105, connected to the multiuser display 105, or combinations thereof. The computer 300 includes a processor 305, a memory 310, and communication hardware 315. The memory 310 may be a semiconductor storage device, a hard disk drive, an optical storage device, a micromechanical storage device, or combinations thereof. The memory 310 may store machine readable code. The machine readable code may be executed by the processor 305 to perform one or more functions. The communication hardware 315 may communicate with other devices.

Figure 6:
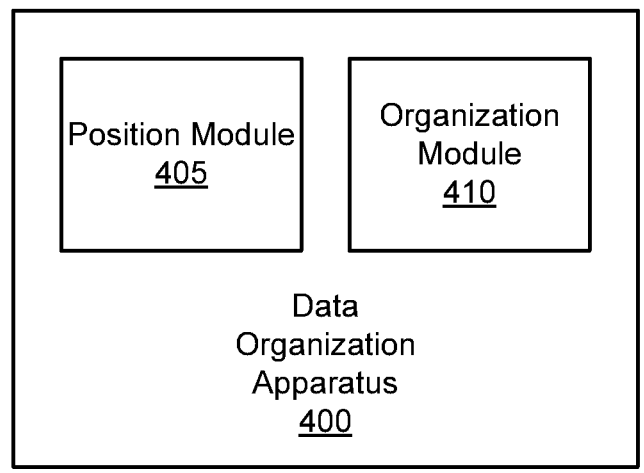
FIG. 6 is a schematic block diagram illustrating one embodiment of a data organization apparatus.

FIG. 6 is a schematic block diagram illustrating one embodiment of a data organization apparatus 400. The apparatus 400 may be embodied in the computer 300 of FIG. 5. The apparatus 400 may include a position module 405 and an organization module 410. The position module 405 and the organization module 410 may be embodied in the memory 310 storing machine readable code executable by the processor 305.

The position module 405 determines the first user position 185a from the audible signal 135. The organization module 410 organizes display data 180 on the multiuser display 105 in response to the first user position 185a as will be described hereafter.

Figure 7:
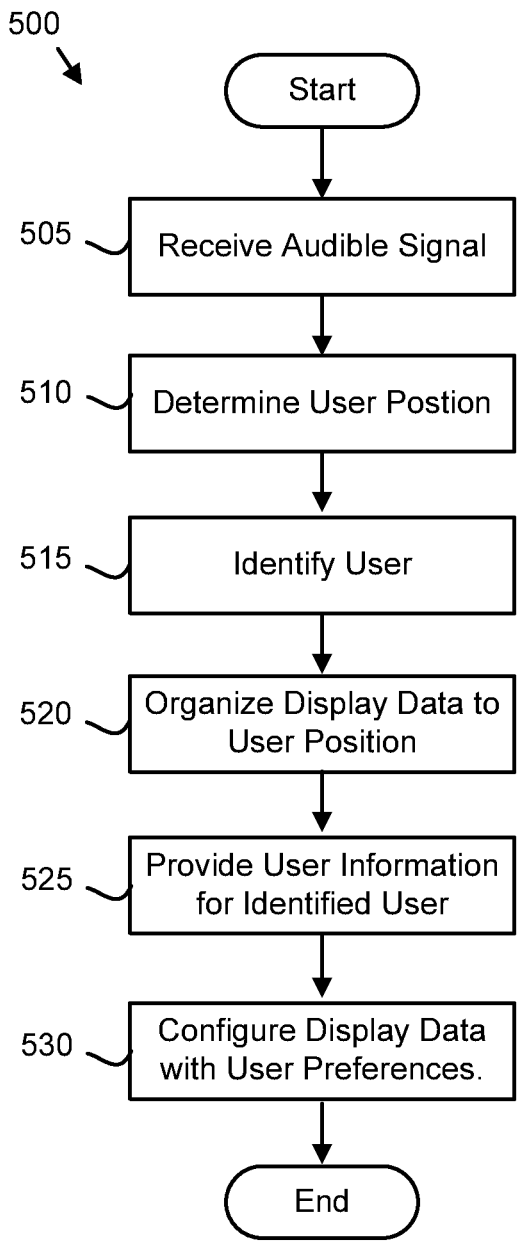
FIG. 7 is a flowchart diagram illustrating one embodiment of a display data organization method.

FIG. 7 is a schematic flow chart diagram illustrating one embodiment of a data organization method 500. The method 500 may perform the functions of the multiuser display 105 and the apparatus 400. In one embodiment, the method 500 is performed by the processor 305. Alternatively, the method 500 may be performed by a program product. The program product may comprise a computer readable storage medium such as the memory 310 storing machine readable code that is executable by the processor 305 to perform the operations of the method 500.

The method 500 starts, and in one embodiment, a microphone array 120 receives the audible signal 135. One or more microphone arrays 120 may receive the audible signal 135. The audible signal 135 may be from a first user speaking. Alternatively, the audible signal 135 may be from movement by the first user.

In a certain embodiment, the audible signal 135 is from a pen 140 such as an ultrasonic pen and/or an acoustic pen. In addition, the audible signal 135 may be from a surface touch acoustic such as typing on a virtual keyboard on the multiuser display 105, writing with the stylus, finger, or other object on the multiuser display 105, and the like.

The position module 405 may further determine 510 the first user position 185a from the audible signal 135. In one embodiment, the position module 405 determines 510 a plurality of user positions 185 from a plurality of audible signals 135.

The position module 405 may determine 510 the first user position 185a from the audible signal 135 with sound source localization. In one embodiment, the position module 405 calculates an audible vector 175 from one or more microphone arrays 120 to the audible source 130 and/or to the pen 140. The position module 405 may determine a time difference between when the audible signal 135 is received at a first microphone and when the audible signal 135 is received at a second microphone of the microphone array 120. The time difference is used with the microphone locations 215 to determine an audible vector 175 to the audible source 130 and/or pen 140.

The first user position 185a may be estimated to be the audible source 130. In one embodiment, the first user position 185a is determined to be the audible source 130 if the audible source 130 is beyond an edge 170 and/or bezel 110 of the multiuser display 105.

If the audible source 130 is within the edges 170 and/or bezels 110 of the multiuser display 105, the audible source 130 may be determined to be a pen 140 and/or a surface touch acoustic. The first user position 185a may be determined to be along a pen vector 176 from the audible source 130. The first user position 185a may be determined to be located adjacent the edge 170 and/or bezel 110 of the multiuser display 105 with a center of the first user position 185a intersecting the pen vector 176. In one embodiment, adjacent to the edge 170 of the multiuser display 105 is within 0 to 40 cm of an edge 170 of the multiuser display 105.

In one embodiment, each user position 185 includes a motion vector. The motion vector may estimate the user position 185 at a plurality of discrete times and/or continuously over a time interval. The motion vector may be applied to the user position 185 to update the user position 185 over time.

The position module 405 may further identify 515 the first user. In one embodiment, the position module 405 identifies 515 the first user using voice recognition. For example, the position module 405 may compare an audible signature 230 with the audible signal 135 to identify the first user. In one embodiment, the position module 405 identifies 515 a plurality of users.

In an alternate embodiment, the position module 405 may query the user at the user position 185 for the identity of the user. The user may self identify in response to the query. In one embodiment, the position module 405 records of voice print for the user and stores the voice print along with the user's name and/or other identifying information in the user identifier 235. The position module 405 may subsequently identify 515 the user using the voice print.

In a certain embodiment, the position module 405 may use a video camera of the multiuser display 105 may identify 515 the user from a biometric identification selected from a facial identification, a retinal identification, and the like. Alternatively, the position module 405 may use biometric information such as a fingerprint recorded by the multiuser display 105 to identify 515 the user.

The orientation module 410 may organize 520 the display data 180 on the multiuser display 105 in response to the user position 185. In one embodiment, the display data 180 is organized as oriented toward the user position 185 as illustrated in FIG. 4C.

In an alternate embodiment, the organization module 410 may organize 520 a first instance of the display data 180a as oriented towards a first user position 185a and organize 520 a second instance of the display data 180b as oriented towards a second user position 185b as illustrated in FIG. 4G. Thus multiple users gathered around the multiuser display 105 may each be able to clearly view instances of the display data 180. In one embodiment, changes to one instance of the display data 180 are propagated to other instances of the display data 180.

Alternatively, the organization module 410 may organize 520 first display data 180a oriented towards the first user position 185a and different second display data 180b oriented towards the second user position 185b as illustrated in FIG. 4J. In one embodiment, the organization module 410 organizes 520 the display data 180 towards the user position 185 associated with the most recent audible signal 135.

The organization module 410 may organize 520 the display data 180 in response to the first user position 185a and the second user position 185b so that the display data 180 is partially oriented towards both the first user position 185a and the second user position 185b as illustrated in FIGS. 4H and 4I. Thus the multiuser display 105 may display the single instance of the display data 180 for the users at both the first user position 185a and the second user position 185b. In one embodiment, the organization module 410 organizes 520 the display data 180 for a plurality of user positions 185.

The organization module 410 may further provide 525 user information 190 for the user at the user position 185. In addition, the organization module 410 may configure 530 the display data 180 with user preferences for the user and the method 500 ends.

Multiuser displays allow multiple users to cooperatively work on one more sets of display data 180. However, the large size of multiuser displays 105 and the convenient access to the multiuser displays 105 from multiple user positions 185 make it possible for the multiuser display 105 to provide the display data 180 at positions and orientations that are inconvenient to the users. Rather than restricting the user positions from which a user can work with the multiuser display 105 or requiring the users to explicitly configure the position and orientation of display data 180 on the multiuser display 105, the embodiments determine a user position 185 from the audible signal 135.

After determining the user position 185 for the user of the multiuser display 105, the embodiments automatically organize the display data 180 so the display data 180 is most advantageously viewed by the user. Thus while the user is working with the multiuser display 105, the user is free to move relative to the multiuser display 105 without constantly adjusting the organization and orientation of the display data 180.

In addition, the embodiments may organize the display data 180 for multiple user positions 185. The embodiments may determine multiple user positions 185 from one or more audible signals 135 and organize the display data 180 for the multiple user positions 185. Thus multiple users may work with the multiuser display 105 from a variety of positions without explicitly reconfiguring the position and orientation of display data 180.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
 a processor;
 a horizontal multiuser display accessible to the processor; and
 a memory storing machine readable code executable by the processor, the machine readable code comprising:
 a position module determining a first user position from an audible signal and determining a second user position from a second audible signal; and
 an organization module organizing display data on the horizontal multiuser display oriented at a first display angle to a first user vector for the first user position and at a second display angle to a second user vector for the second user position, wherein the first display angle is equivalent to the second display angle.

2. The apparatus of claim 1, the organization module further organizing a first instance of the display data oriented to the first user position and a second instance of display data oriented to the second user position.

3. The apparatus of claim 1, wherein the first user position comprises a motion vector.

4. The apparatus of claim 1, further comprising a microphone array receiving the audible signal.

5. The apparatus of claim 4, wherein the first user position is determined from the audible signal with sound source localization.

6. A method comprising:
 determining, by use of a processor, a first user position from an audible signal;
 determining a second user position from a second audible signal; and
 organizing display data on a horizontal multiuser display oriented at a first display angle to a first user vector for the first user position and at a second display angle to a second user vector for a second user position, wherein the first display angle is equivalent to the second display angle.

7. The method of claim 6, the method further comprising organizing a first instance of the display data oriented to the first user position and a second instance of the display data oriented to the second user position.

8. The method of claim 6, further comprising receiving the audible signal with a microphone array.

9. The method of claim 6, wherein the first user position is determined from the audible signal with sound source localization.

10. The method of claim 6, wherein the first user position comprises a motion vector.

11. The method of claim 6, further comprising identifying a first user from the audible signal.

12. The method of claim 11, wherein the display data is provided with user information for the first user.

13. The method of claim 11, wherein the display data is configured with user preferences for the first user.

14. The method of claim 6, wherein the audible signal is emitted from one or more of an ultrasonic pen, an acoustic pen, and a surface touch acoustic.

15. A non-transitory computer readable storage medium storing machine readable code executable by a processor to perform:
  determining a first user position from an audible signal and determining a second user position from a second audible signal; and
  organizing display data on a horizontal multiuser display oriented at a first display angle to a first user vector for the first user position and at a second display angle to a second user vector for the second user position, wherein the first display angle is equivalent to the second display angle.

16. The non-transitory computer readable storage medium of claim 15, wherein the audible signal is received by a microphone array and the first user position is determined from the audible signal with sound source localization.

17. The non-transitory computer readable storage medium of claim 15, the code further performing organizing a first instance of the display data oriented to the first user position and a second instance of the display data oriented to the second user position.

* * * * *